United States Patent
Lee et al.

(10) Patent No.: US 10,773,722 B2
(45) Date of Patent: Sep. 15, 2020

(54) METHOD FOR CONTROLLING A MOTOR TORQUE OF A HYBRID ELECTRIC VEHICLE

(71) Applicants: HYUNDAI MOTOR COMPANY, Seoul (KR); KIA MOTORS CORPORATION, Seoul (KR)

(72) Inventors: Soo Bang Lee, Suwon-si (KR); Hye Kil Hwang, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 216 days.

(21) Appl. No.: 15/609,970

(22) Filed: May 31, 2017

(65) Prior Publication Data
US 2018/0162403 A1 Jun. 14, 2018

(30) Foreign Application Priority Data
Dec. 13, 2016 (KR) .................... 10-2016-0169198

(51) Int. Cl.
| | |
|---|---|
| *B60W 30/18* | (2012.01) |
| *B60W 10/08* | (2006.01) |
| *B60W 10/10* | (2012.01) |
| *B60W 20/30* | (2016.01) |
| *B60W 30/19* | (2012.01) |

(Continued)

(52) U.S. Cl.
CPC ....... *B60W 30/18127* (2013.01); *B60K 6/442* (2013.01); *B60W 10/08* (2013.01); *B60W 10/10* (2013.01); *B60W 10/11* (2013.01); *B60W 20/14* (2016.01); *B60W 20/30* (2013.01); *B60W 30/19* (2013.01); *B60W 2510/1005* (2013.01); *B60W 2540/12* (2013.01); *B60W 2710/083* (2013.01); *B60W 2710/1005* (2013.01); *Y10S 903/93* (2013.01); *Y10S 903/945* (2013.01)

(58) Field of Classification Search
CPC ........... B60W 30/18127; B60W 20/30; B60W 10/10; B60W 10/08; B60W 2710/1005; B60W 2540/12; B60W 2510/1005; B60W 2710/083; Y10S 903/93; Y10S 903/945; B60Y 220/92
See application file for complete search history.

(56) References Cited

U.S. PATENT DOCUMENTS

2017/0166194 A1* 6/2017 Kumazaki ............. B60W 10/06

* cited by examiner

*Primary Examiner* — Jeffrey C Boomer
(74) *Attorney, Agent, or Firm* — Brinks Gilson & Lione (57) ABSTRACT

A method for controlling a motor torque of a hybrid electric vehicle is provided. The method may include: detecting, with a controller, a downshift request during a regenerative braking; determining, with the controller, a target gear stage and a motor torque command, wherein the motor torque command is determined at a pre-shift stage before entering into a torque intervention; determining, with the controller, a motor torque command of the target gear stage; determining, with the controller, an intervention torque based on the motor torque command and the motor torque command of the target gear stage during a downshift control process; and controlling a torque intervention to control a regenerative operation of the motor based on the intervention torque, wherein determining the intervention torque includes changing the intervention torque from the motor torque command to a target value, which is set as the motor torque command of the target gear stage, during a shift control process.

7 Claims, 7 Drawing Sheets

(51) Int. Cl.
*B60W 20/14* (2016.01)
*B60W 10/11* (2012.01)
*B60K 6/442* (2007.10)

METHOD FOR CONTROLLING A MOTOR TORQUE OF A HYBRID ELECTRIC VEHICLE

CROSS-REFERENCE TO RELATED APPLICATION

This present application claims priority to and the benefit of Korean Patent Application No. 10-2016-0169198, filed on Dec. 13, 2016, which is incorporated herein by reference in its entirety.

FIELD

The present disclosure relates to a method for controlling a hybrid electric vehicle, and more particularly, to a method for controlling a motor torque in a hybrid electric vehicle.

BACKGROUND

The statements in this section merely provide background information related to the present disclosure and may not constitute the related art.

A hybrid electric vehicle (HEV) is a vehicle using two or more kinds of different driving sources and generally means a vehicle that is driven by an engine for generating a driving force by burning fuel and a motor generating a driving force with electric energy of a battery.

The hybrid electric vehicle is equipped with a hybrid control unit (HCU) that is an upper controller for controlling the overall operation of the vehicle and is also equipped with various controllers for controlling various kinds of devices of the vehicle.

For example, the hybrid electric vehicle is equipped with an engine control unit (ECU) configured to control the operation of the engine, a motor control unit (MCU) configured to control the operation of the motor, a transmission control unit (TCU) configured to control the operation of the transmission, a battery management system (BMS) configured to collect battery status information to be used for a charging and discharging control of the battery or provide the collected battery status information to other controllers and perform a control to manage the battery, a brake control unit (BCU) configured to perform a braking control of the vehicle, and the like.

The HCU and the respective controllers perform a cooperative control for the in-vehicle apparatuses while exchanging information with each other through CAN communication. Here, the upper controller transfers a control command to the lower controller while collecting a variety of information from the lower controllers.

Meanwhile, in the TMED hybrid electric vehicles (HEV and PHEV), to offset a shock occurring due to the sudden fluctuation in the torque on the output side of the transmission at the time of the shift, a torque intervention control is performed to reduce the motor torque transmitted to the input side of the transmission.

Further, the torque intervention control is performed even when the shift is made while a driver steps on a brake pedal to perform the regenerative braking, that is, the downshift to change a gear stage of the transmission downward during the regenerative braking.

Further, in the control for the downshift during the regenerative braking, the related art uses a torque control system of a conventional vehicle that does not perform the regenerative braking.

That is, control logic is implemented as a reference for controlling the conventional vehicle at the time of the downshift during the regenerative braking. Because the conventional vehicle does not use a negative (−) torque, the control logic is not suitable for the control of the hybrid electric vehicle performing the regenerative braking.

Further, the existing control system controls the intervention torque according to the shift progress state when the downshift is made, and thus, for example, an absolute value of the intervention torque gradually decreases along slopes by phase and slopes by actual shift progress rate.

At this point, because the torque at the time of the regenerative braking is the negative torque, the intervention torque is determined so that the absolute value thereof gradually decreases along a slope considering the shift progress state. As such, the intervention torque determined according to the shift progress state during the shift is used as a motor torque command to control the regenerative operation of the motor, such that the absolute value of the motor torque (negative torque) is reduced.

However, according to the above-mentioned related art, when the method for performing a feedforward control on the motor torque by the intervention torque determined based on the slopes by the shift phase and the slopes by the actual shift progress rate from the torque intervention entry timing for the shift, is applied, the torque may greatly fluctuate while the torque intervention is released at the end of the shift or after the completion of the actual shift, thereby deteriorating the braking linearity.

SUMMARY

The present disclosure provides a method for controlling a motor torque, which is capable of improving a braking linearity of the existing control method at the time of a downshift during regenerative braking in a hybrid electric vehicle.

In one aspect, the present disclosure provides, a method for controlling a hybrid electric vehicle includes: detecting, with a controller, a downshift request during a regenerative braking; determining, with the controller, a target gear stage and a motor torque command, wherein the motor torque command is determined at a pre-shift stage before entering into a torque intervention; determining, with the controller, a motor torque command of the target gear stage; determining, with the controller, an intervention torque based on the motor torque command and the motor torque command of the target gear stage during a downshift control process; and controlling a torque intervention to control a regenerative operation of the motor based on the intervention torque, wherein the intervention torque is determined that the intervention torque changes from the motor torque command to a target value, which is set as the motor torque command of the target gear stage, during a shift control process.

Other aspects of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

First, in order to help understanding of the present disclosure, a method for controlling a motor torque at the time of a downshift during regenerative braking of a hybrid electric vehicle according to the related art will be described in more detail with reference to FIGS. 2 and 3.

Figure 1:
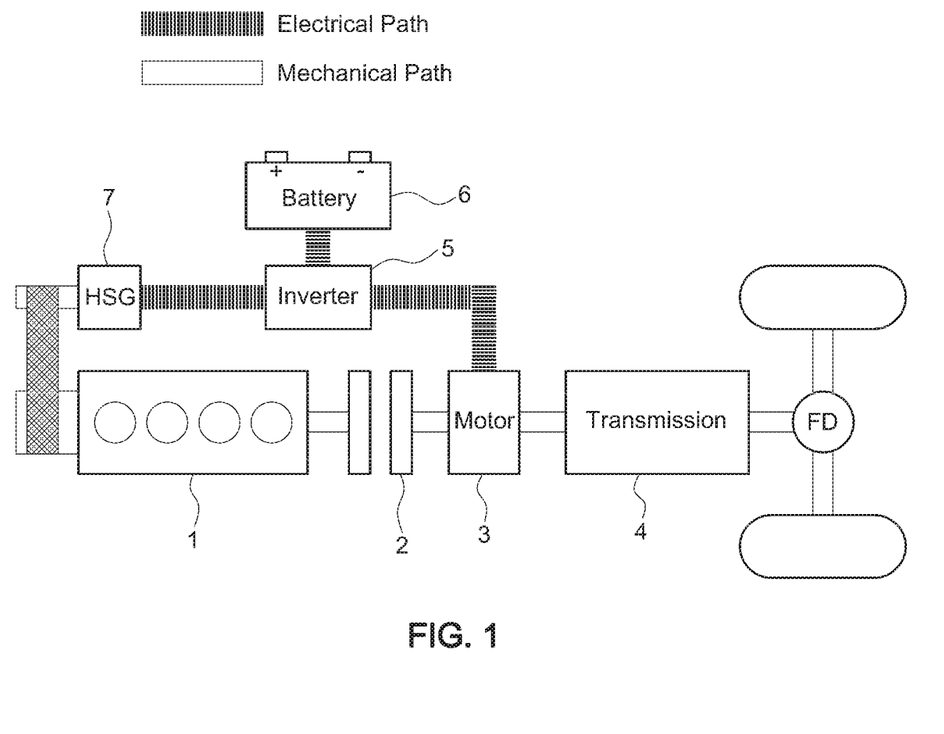
FIG. 1 is a diagram schematically illustrating a configuration of a power train of a hybrid electric vehicle.
Figure 2:
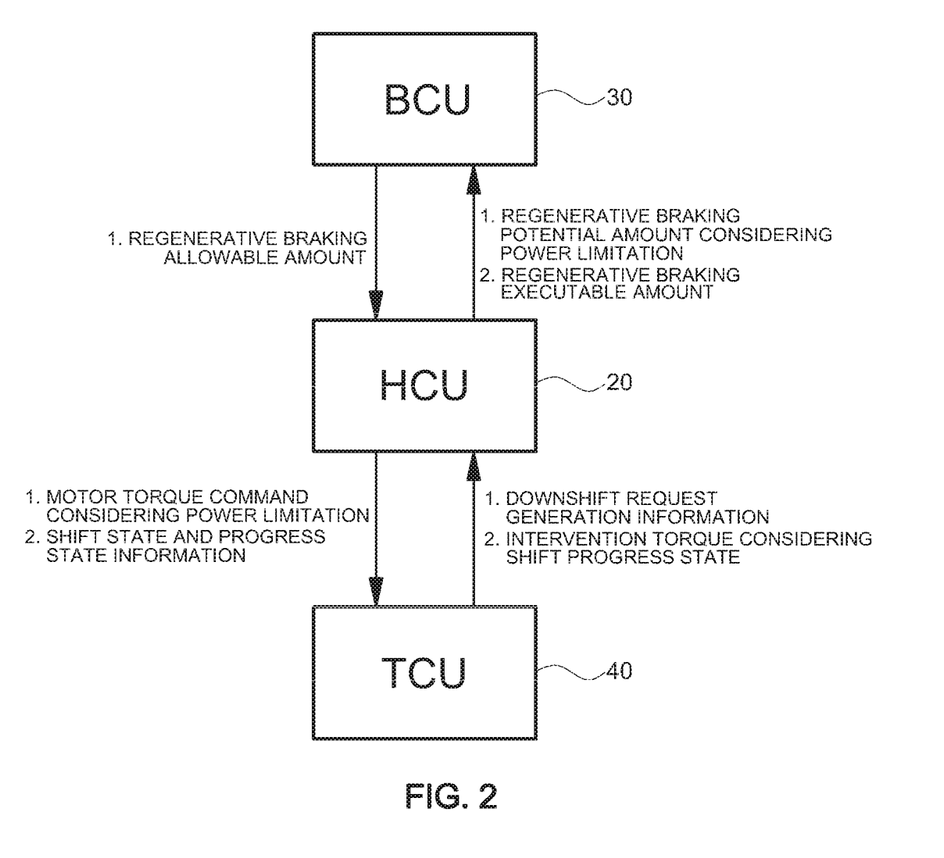
FIG. 2 is a diagram illustrating an example in which a cooperative control between controllers is made at the time of a downshift during regenerative braking in the related art.
Figure 3:
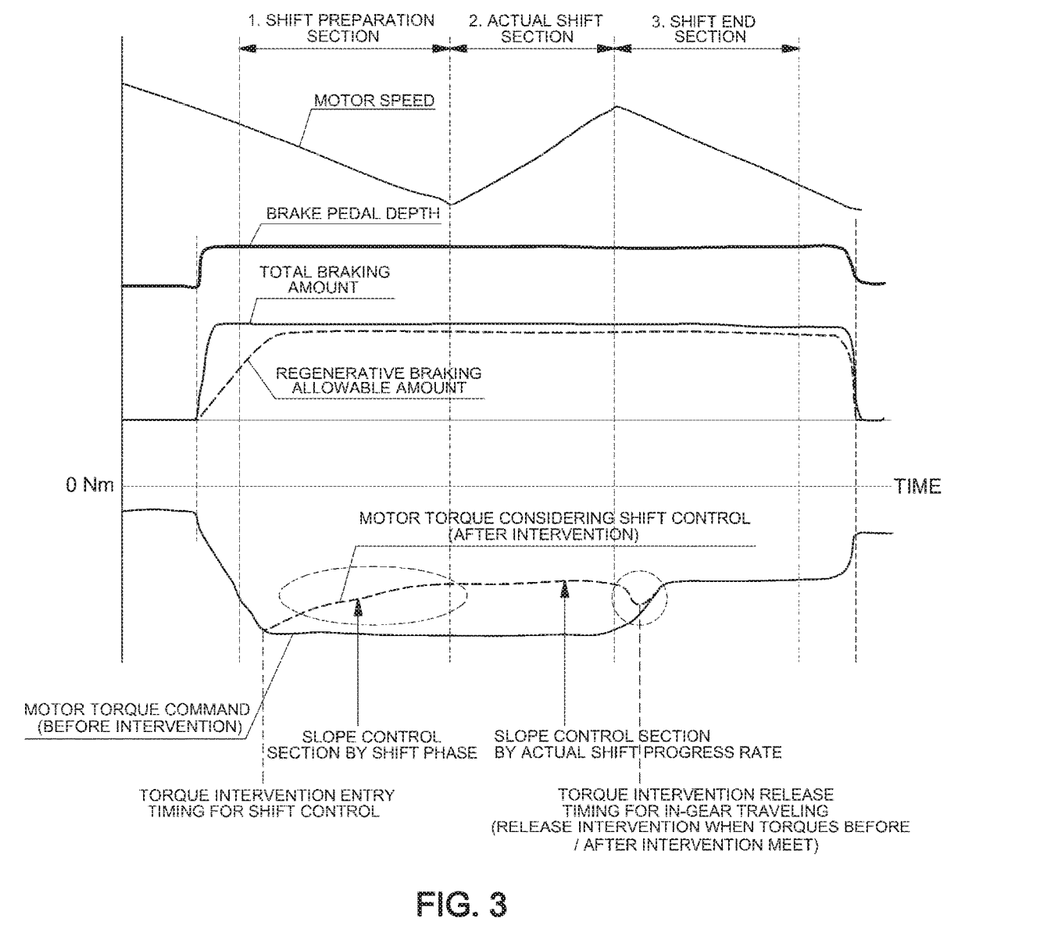
FIG. 3 is a diagram illustrating a motor torque control state at the time of the downshift shifting during the regenerative braking in the related art.

FIG. 2 is a diagram illustrating an example in which a cooperative control between controllers is made at the time of a downshift during regenerative braking and FIG. 3 is a diagram illustrating a motor torque control state at the time of the downshift shifting during the regenerative braking.

As illustrated, in order to control a motor torque at the time of a downshift during regenerative braking, a mutual cooperation control is made between a HCU that is an upper controller and a TCU for controlling a transmission and a brake control unit (BCU) for a braking control.

Although not illustrated in FIG. 2, a regenerative torque during normal regenerative braking is determined based on information such as battery chargeable power that is battery status information and motor chargeable torque that is motor status information, in the HCU, and therefore a BMS that collects the battery status information and provides the collected battery status information to the HCU and an MCU that provides the motor status information to the HCU participate in the control process of the regenerative braking.

In addition, the MCU controls a regenerative operation of the motor according to a regenerative torque command (motor torque command during regenerative braking) that the HCU outputs.

First, the BCU determines a total braking amount desired in a vehicle depending on a braking input value of a driver and the HCU determines the regenerative braking potential amount based on the information such as the battery chargeable power and the motor chargeable torque and transmits the determined regenerative braking potential amount to the BCU.

Here, the braking input value of the driver may be a value depending on a brake pedal manipulation state of the driver, and more specifically, may be a brake pedal depth (brake pedal stroke) that is a signal value of a brake pedal sensor (BPS).

Therefore, the BCU distributes (distribute a braking force) the total braking amount into a frictional braking amount (hydraulic braking amount) by a frictional braking device and a regenerative braking amount by the motor, based on the regenerative braking potential amount.

Then, if the BCU transmits a regenerative braking allowable amount to the HCU, the HCU generates and outputs a regenerative torque command (motor torque command) depending on the regenerative braking allowable amount, and the MCU controls the regenerative operation of the motor according to the regenerative torque command that the HCU outputs.

In addition, the HCU calculates a regenerative braking executable amount according to whether a shift is made based on shift status information received from the TCU, and the BCU receives the regenerative braking executable amount from the HCU to finally determine the frictional braking amount obtained by subtracting the regenerative braking executable amount from the total braking amount.

Next, the BCU controls the operation of the frictional braking apparatus so as to generate the braking force corresponding to the finally determined frictional braking amount, such that the total braking force required by the driver may be satisfied by the regenerative braking force by the motor and the frictional braking force by the frictional braking apparatus.

Meanwhile, the torque intervention control is performed while the shift is made during the regenerative braking and the regenerative operation of the motor is controlled depending on the intervention torque determined by the TCU.

That is, if the TCU detects a downshift request according to the shift pattern from the operation information of the vehicle during the regenerative braking, the TCU transmits the generation of the downshift request to the HCU and the HCU transmits the regenerative torque command (motor torque command) to the TCU in consideration of a pre-intervention torque determined in a pre-shift gear stage (current gear stage) state, that is, a power limitation such as the battery chargeable power and the motor chargeable torque.

In addition, the TCU determines the intervention torque according to the shift progress state on the basis of the regenerative torque command and transmits the determined intervention torque to the HCU and the HCU outputs a command value of the intervention torque to the MCU during the shift control by the TCU and therefore the MCU controls the regenerative operation of the motor according to the intervention torque command.

The motor torque control state at the time of the downshift during the regenerative braking according to the related art will be described in more detail with reference to FIG. 3. In general, the TCU subdivides the overall shift process into several sections to perform the shift control defined by section. At this point, each section may be subdivided into several phases that perform the defined shift control according to specifications of the TCU.

However, the shift phase may be divided or defined differently according to the specifications of the TCU, but at least three shift control sections of a shift preparation section, an actual shift section, and a shift end section are commonly divided and used in the TCU.

Among those, the actual shift section is a section where a gear ratio is actually changed by a hydraulic pressure and the TCU uses several information such as a current gear stage and a target gear stage during the shift control process to transmit a hydraulic pressure to operating elements in the transmission, such that the gear ratio may be changed.

Further, the TCU provides the information on the current shift progress state, that is, the information on the shift preparation section, the actual shift section, and the shift end section (information on the start and the end of each section, etc.) to the HCU during the shift control process and may provide the information on the shift phase that is currently being progressed among the shift phases subdivided by section.

At this point, the respective friction elements of the transmission are selectively open and closed according to a predetermined method by the shift control section of the shift preparation, the actual shift, and the shift end, and a back pressure control of the hydraulic pressure is performed using the defined friction elements among the friction elements of the transmission.

FIG. 3 is a diagram illustrating a 'motor torque considering a shift control' curve, which indicates the motor torque after the intervention entry, that is, the intervention torque. Here, the intervention torque is determined by the TCU according to the shift progress state of each shift control section and then transmitted to the HCU.

Further, FIG. 3 is a diagram illustrating a 'motor torque command' curve, which indicates the motor torque command (regenerative torque command) determined by the HCU and may indicate the pre-intervention torque that does not consider the torque intervention.

Further, in FIG. 3, the time when the motor torque (motor torque considering shift control) after the intervention entry meets the motor torque not considering intervention becomes torque intervention release timing for in-gear traveling.

As illustrated, when the driver manipulates the brake pedal to make the downshift request during the regenerative braking, the torque intervention control is performed to reduce the absolute value of the motor torque. At this point, the motor torque, i.e., the intervention torque is determined so that the absolute value thereof gradually decreases along the slopes set by shift progress state on the basis of the motor torque command (negative torque as the regenerative torque command) of the torque intervention entry timing.

Here, the decrease in the absolute value of the intervention torque means that the intervention torque curve ('motor torque considering the shift control' curve) increases along the slope as illustrated in FIG. 3. In FIG. 3, it may be appreciated that the intervention torque curve gradually increases on the basis of the motor torque command of the torque intervention entry timing.

Conventionally, the intervention torque (absolute value) is determined so that it decreases (increases in the drawing) along the set slope according to the shift progress state in the shift preparation section and the actual shift section, and thus the slope control to be feedforward controlled is made.

At this point, the intervention torque is determined so that it is changed to slopes preset by phase as the shift phase is progressed in the shift preparation section, and the intervention torque is determined so that it is changed to slopes preset by actual shift progress rate in the actual shift section.

That is, the shift preparation section may be referred to as a slope control section by the shift phase and the actual shift section may be referred to as a slope control section by the actual shift progress rate.

In addition, the HCU uses the intervention torque (motor torque after the intervention entry) determined and transferred by the TCU during the shift control as the torque command so that the regenerative operation of the motor may be controlled and the torque intervention control is released at the time when the post-intervention torque meets the torque without considering the intervention.

In the HCU, the pre-intervention motor torque, that is, the motor torque command without considering the torque intervention is maintained at the value of the torque intervention entry timing in the shift preparation section and the actual shift section and then the absolute value of the motor torque is determined to decrease (increase on the torque curve) in the shift end section.

On the other hand, the intervention torque is determined so that the absolute value thereof continues to decrease (increase on the torque curve) only along the slopes by the shift phase and the slopes by the shift progress rate, and therefore the minimum value of the final absolute value may not be known. Therefore, as illustrated in FIG. 3, the torque may greatly fluctuate before and after the torque intervention release timing.

As a result, as the torque intervention control release is made at the time when the post-intervention torque meets the torque without considering the intervention, as illustrated in FIG. 3, the torque excessively fluctuates in the shift end section after the completion of the actual shift, such that the problem of the braking linearity that causes the pushing feeling after the pulling during the braking may arise.

Further, in the case of power-on/downshift at the time of an acceleration, it is possible to figure out the desired torque level after the completion of the shift, but it is difficult to know the target torque after the completion of the shift in case of the downshift during the regenerative braking, such that the intervention torque is determined using the set slope according to the shift progress state and then controlled in the feedforward manner, and the torque fluctuates only by the slope (feedforward torque slope).

As a result, the problem of the braking linearity can be improved only by a testing in a vehicle development stage. Also, a mapping process of data such as the slope through a repeated test on a vehicle is desired. Accordingly, time for development will be delayed.

That is, in the process of developing a hybrid electric vehicle (HEV) and a plug-in hybrid electric vehicle (PHEV), it is desired to carry out repetitive vehicle tests with a great deal of time and efforts to improve the shift feeling and the braking linearity during the regenerative braking and the slope and the torque intervention level for feedforward torque control by the shift phase and the shift progress rate need to be determined on the basis of the results of the repeated test.

Figure 4:
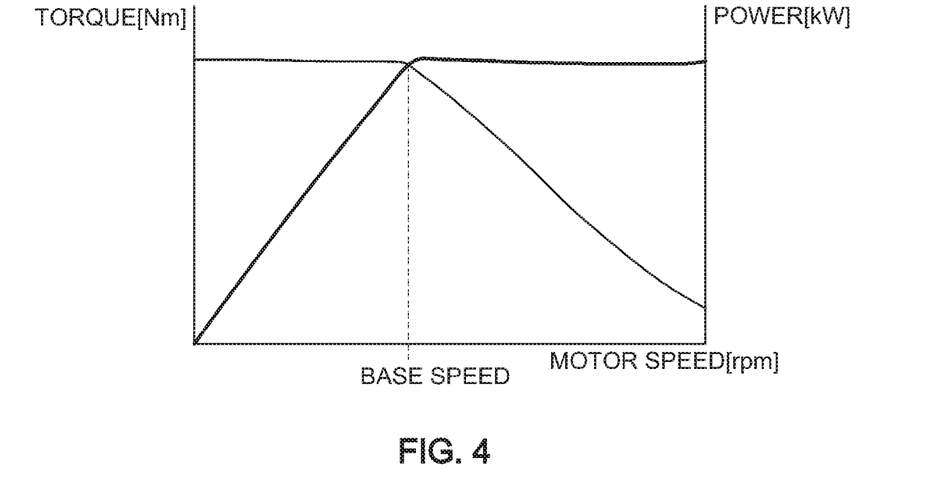
FIG. 4 is a diagram illustrating a torque/power curve of the motor.

FIG. 4 is a diagram illustrating a torque/power curve of a motor. The motor is divided into a constant torque region and a constant power region depending on an operation speed (rpm), wherein a motor speed for determining the two operation regions is referred to as a base speed (rpm).

As can be seen from FIG. 4, the motor has a constant torque characteristic in the operation region below the base speed, the motor torque is constant in the constant torque region, and an absolute value of the motor power (motor torque×motor speed) constantly increases in proportion to the motor speed.

In addition, the motor has a constant power characteristic in the operation region above the base speed, the motor power is constant in the constant power region, and the absolute value of the motor torque (=motor power/motor speed) decreases inversely to the motor speed.

Generally, a shift pattern is set so that the shift may be generated during the regenerative braking in the motor speed (rpm) region (region where the motor efficiency is best) where the constant torque region and the constant power region are close to each other.

However, if the shift pattern is set as described above, a motor torque difference between the current gear stage (pre-shift gear stage) and the target gear stage (post-shift gear stage) may occur. The motor torque fluctuates at the time of the completion of the actual shift due to the difference and therefore the problem of the braking linearity may arise.

Therefore, the present disclosure proposes a method for controlling a motor torque capable of improving the problem of the braking linearity of the existing control method when the downshift is shifted during the regenerative braking in the hybrid electric vehicle.

Figure 5:
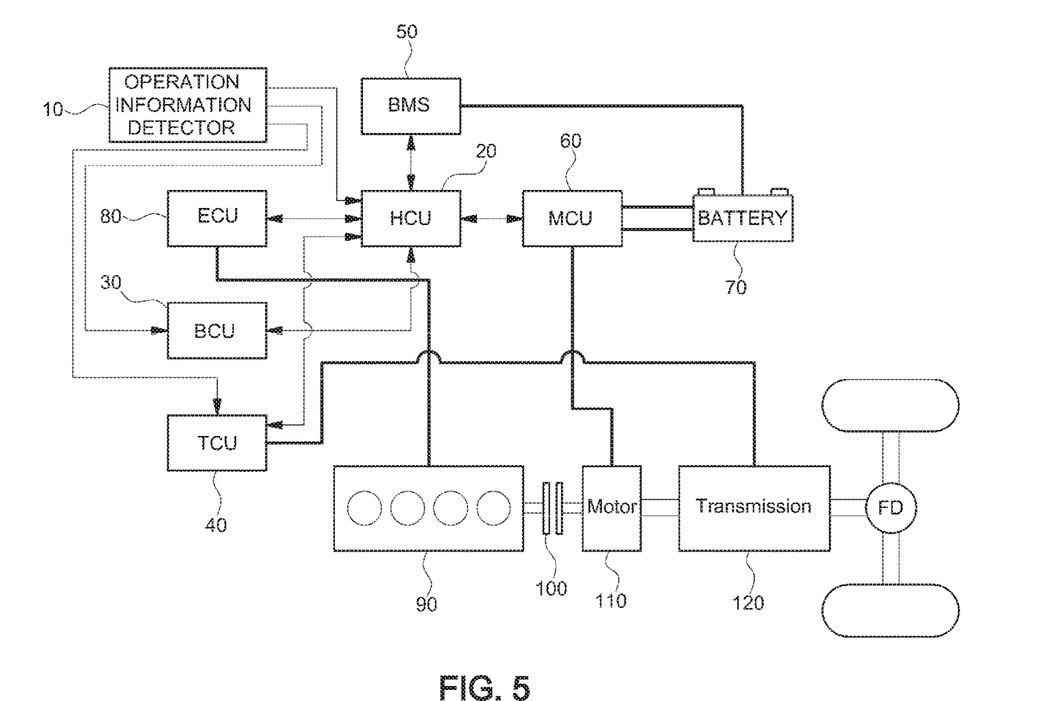
FIG. 5 is a system configuration diagram of a hybrid electric vehicle to which the present disclosure is applied.

FIG. 5 is a system configuration diagram of a hybrid electric vehicle to which the present disclosure is applied.

As illustrated in FIG. 5, the hybrid electric vehicle includes an engine 90 and a motor 110 configured to serve as a driving sources for traveling the vehicle, an engine clutch 100 configured to be interposed between the engine 90 and the motor 110, a transmission 120 configured to be connected to an output side of the motor 110, an MCU 60 configured to include an inverter for driving and controlling the motor 110, and a battery 70 configured to serve as a power source of the motor 110 and be connected to the motor 110 via the inverter included in the MCU 60 to charge and discharge the motor 110.

In FIG. 5, reference numeral 10 denotes an operation information detector that may be configured to include an accelerator position sensor (APS), a brake pedal sensor (BPS), a vehicle speed detector, and the like and may be connected to the HCU 20, the BCU 30, the TCU 40 that are uppermost controllers to be able to input the detected values.

The engine clutch 100 is closed or open by a hydraulic pressure to connect or disconnect between the engine 90 and the motor 110 to be able to transmit power to the engine 90 and the motor 110 and the inverter included in the MCU 60 converts a DC current of the battery 70 into a three-phase AC current for driving of the motor and applies the AC current to the motor 110.

Further, the transmission 120 shifts the power of the motor 110 or the combined power of the engine 90 and the motor 110 and transmits the shifted power to the driving wheels via the driving shaft. As the transmission, the automatic transmission (AT) or the dual clutch transmission (DCT) may be used.

In addition, the hybrid electric vehicle is equipped with the hybrid control unit (HCU) that is the upper controller for controlling the overall operation of the vehicle and is equipped with various controllers for controlling various kinds of devices of the vehicle.

For example, the hybrid electric vehicle includes an ECU 80 configured to control the operation of the engine, the MCU 60 configured to control the driving and regenerative operation of the motor 110, the TCU 40 configured to control the operation of the transmission 120, and a BMS 50 configured to collect the battery status information to be used for a charging and discharging control of the battery 70, provide the collected battery status information to other controllers, and perform a control to manage the battery 70, and the like.

The HCU and the respective controllers perform a cooperative control for the in-vehicle apparatuses while exchanging information with each other through CAN communication. Here, the upper controller transfers a control command to the lower controller while collecting a variety of information from the lower controllers.

Further, the control process of the present disclosure may be performed by a cooperative control of a plurality of controllers such as the HCU 20, the BCU 30, the TCU 40, the BMS 50, and the MCU 60, and may be performed by a single controller having the integrated function of the controllers.

Hereinafter, a method of controlling a motor torque at the time of a downshift during regenerative braking in some forms of the present disclosure will be described in detail with reference to the drawings.

Figure 6:
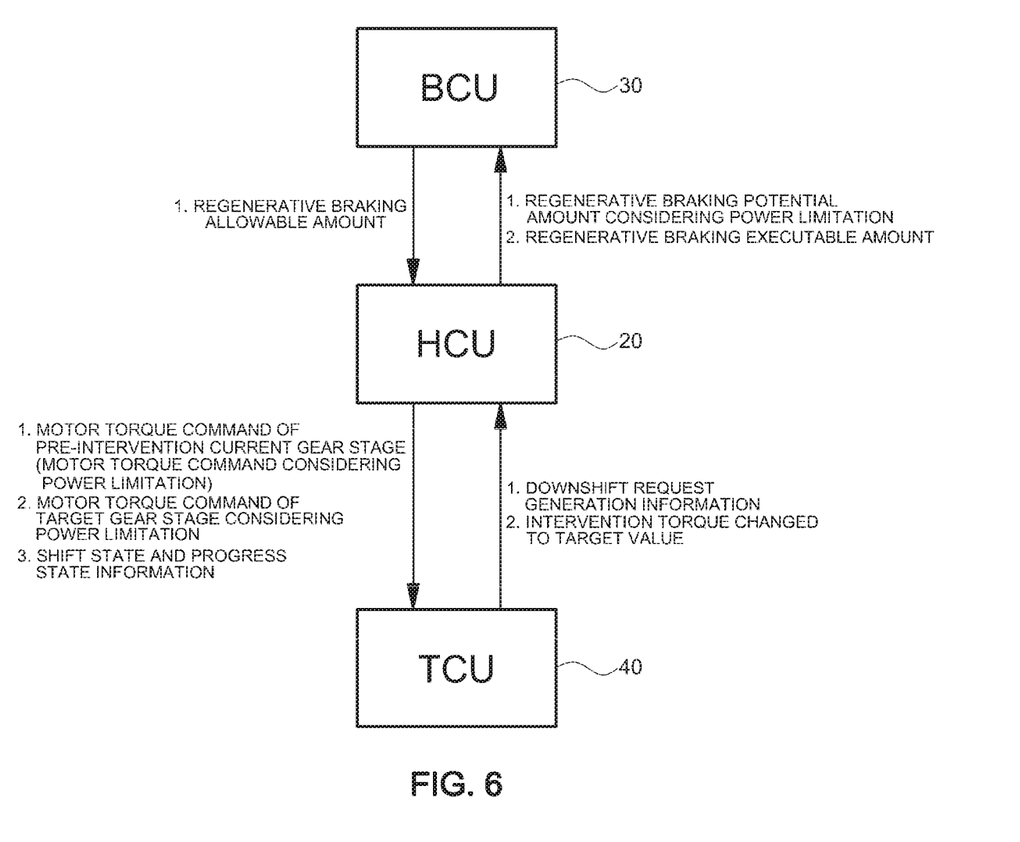
FIG. 6 is a diagram illustrating a motor torque control state at the time of a downshift shifting during the regenerative braking.
Figure 7:
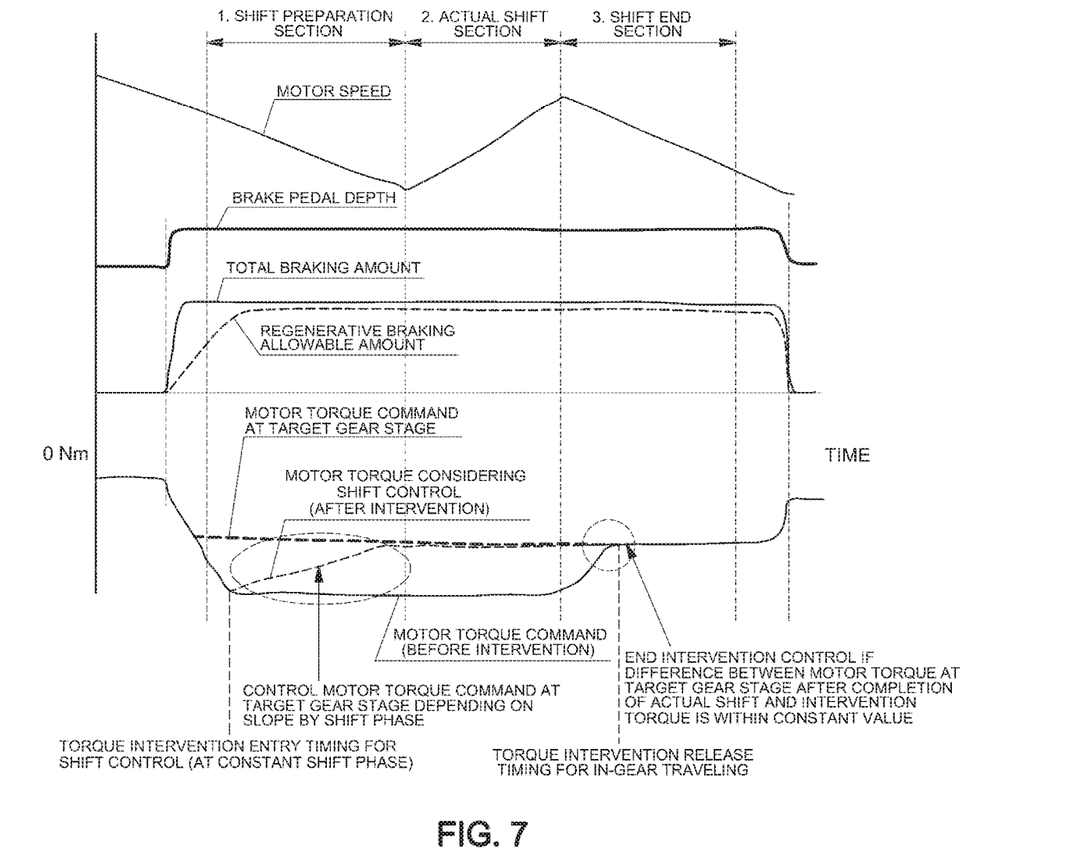
FIG. 7 is a diagram illustrating an example in which a cooperative control between controllers is made at the time of a downshift during regenerative braking.

FIG. 6 is a diagram illustrating a motor torque control state at the time of a downshift shifting during the regenerative braking in some forms of the present disclosure; and FIG. 7 is a diagram illustrating an example in which a cooperative control between controllers is made at the time of a downshift during regenerative braking in some forms of the present disclosure.

First, the BCU 30 determines the total braking amount (i.e., total braking torque) desired by the vehicle depending on the braking input value of the driver detected by the operation information detector 10 and the HCU 20 determines the regenerative braking potential amount (regenerative braking allowable torque) based on the information on the battery chargeable power received from the BMS 50 and then transmits the determined regenerative braking potential amount to the BCU 30.

Here, the braking input value of the driver may be a value based on the brake pedal manipulation state of the driver, and more specifically, may be a brake pedal depth (brake pedal stroke) that is a signal value of a brake pedal sensor (BPS).

Therefore, the BCU 30 distributes (distributes the braking force) the total braking amount into the frictional braking amount (hydraulic braking amount) by the frictional braking device (hydraulic braking device (not illustrated)) and the regenerative braking amount by the motor 110 based on the regenerative braking potential amount to calculate the regenerative braking allowable amount (which may be a torque value).

Then, if the BCU 30 transmits the regenerative braking allowable amount to the HCU 20, the HCU 20 generates and outputs a regenerative torque command (motor torque command) depending on the regenerative braking allowable amount, and the MCU 30 controls the regenerative operation of the motor 110 according to the regenerative torque command that the HCU 20 outputs.

In addition, the HCU 20 calculates the regenerative braking executable amount depending on whether the shift is made from the regenerative torque command based on shift status information received from the TCU 40. Then, the BCU 30 receives the regenerative braking executable amount from the HCU 20 and finally determines the frictional braking amount obtained by subtracting the regenerative braking executable amount from the total braking amount.

Next, the BCU 30 controls the operation of the frictional braking apparatus so as to generate the braking force corresponding to the finally determined frictional braking amount, such that the total braking force required by the driver may be satisfied by the regenerative braking force by the motor 110 and the frictional braking force by the frictional braking apparatus.

Meanwhile, the torque intervention control is performed while the shift is made during the regenerative braking and the regenerative operation of the motor 110 is controlled depending on the intervention torque determined by the TCU 40.

Here, the torque intervention entry timing for the downshift is defined to be timing when the torque intervention reaches the defined shift phase of the shift preparation section.

That is, when the TCU 40 detects a downshift request according to the shift pattern from the operation information detected by the operation information detector 10 during the regenerative braking, the TCU 40 transmits the downshift request generation to the HCU 20 and the HCU 20 transmits the motor torque command of the pre-shift gear stage (current gear stage) determined at the torque intervention entry timing, that is, the pre-intervention regenerative torque command considering the charging power limitations such as the battery chargeable power and the motor chargeable torque to the TCU.

Here, the pre-intervention regenerative torque command means the motor torque command at time of entering into the intervention.

Further, when the TCU 40 detects the downshift request (i.e., when it determines that the downshift is requested), the TCU 40 determines the gear stage targeted after the shift, that is, the target gear stage according to the operation information such as the current traveling vehicle speed inputted from the vehicle speed detector of the operation information detector 10 and the brake pedal depth input from the BPS.

Here, the target gear stage determination process does not have the difference from the normal downshift control process, and therefore a detailed description thereof will be omitted.

Further, the TCU 40 transmits the information on the target gear stage and the HCU 20 receives the motor torque command of the post-shift gear stage, that is, the regenerative torque command at the target gear stage on the basis of the gear ratio of the target gear stage and a regenerative braking executable amount.

Hereinafter, the motor torque command of the post-shift gear stage will be referred to as the 'motor torque command of the target gear stage', which becomes the motor torque command value at the target gear stage considering the power limitation.

The total braking torque desired by the brake pedal manipulation of the driver is the total braking torque to be generated from the wheel at the time of the braking. Accordingly, the regenerative braking executable amount distributed from the total braking amount, which is the remaining braking executable amount obtained by subtracting the frictional braking amount from the total braking amount, becomes the regenerative braking torque to be generated by the motor regenerative operation.

Therefore, the motor torque command (regenerative torque command) for generating the regenerative braking torque at the target gear stage may be calculated from the regenerative braking executable amount, and more specifically, may be calculated from the regenerative braking executable amount and the gear ratio of the target gear stage.

Preferably, the motor torque command (regenerative torque command) of the target gear stage may be additionally obtained using the transmission efficiency together with the regenerative braking executable amount and the gear ratio of the target gear stage.

For example, the motor torque command of the target gear stage may be calculated based on a value obtained by dividing the regenerative braking executable amount by the gear ratio of the target gear stage and the transmission efficiency.

If the HCU 20 determines the motor torque of the target gear stage as described above, the HCU 20 transmits the motor torque command of the target gear stage to the TCU 40. Then, TCU 40 determines the intervention torque during the shift control on the basis of the motor torque command (motor torque command and regenerative torque command at the intervention entry timing) at the pre-shift current gear stage received from the HCU 20 and the motor torque command of the target gear stage. Subsequently, TCU 40 transmits the determined intervention torque to the HCU 20.

That is, when reaching the defined shift phase of the shift preparation section, the TCU 40 determines it as the torque intervention entry timing, and then sets the motor torque command of the target gear stage as the target value from the torque intervention entry timing to determine the intervention torque as a value whose absolute value gradually decreases.

At this point, the intervention torque is obtained as the value whose absolute value gradually decreases based on the motor torque command of the current gear stage and the intervention torque may be obtained so that the absolute value decreases along the defined slope.

Preferably, the slopes set by phase may be used while the shift phase is reaching to the shift phase defined in the shift preparation section or the shift preparation section and the actual shift section. Then, the absolute value of the intervention torque decreases (increases on the curve of FIG. 6) depending on the set slope.

However, in the present disclosure, the final target value for the intervention torque that decreases the absolute value is set and the target value is set as the motor torque command of the target gear stage, so that if the intervention torque reaches the motor torque command of the target gear stage, the intervention torque is determined by the motor torque command of the target gear stage and maintained.

FIG. 6 illustrates an example in which the intervention torque reaches the target value during the shift preparation section. Here, the intervention torque determination process of decreasing the absolute value may be performed so that the absolute value of the intervention torque reaches the target value until a part or all of the shift preparation period and the actual shift section and a part of the shift end section.

While the shift control process is performed as described above, the TCU 40 transmits the intervention torque obtained in real time to the HCU 20. Then, the HCU 20 transmits a command value of the intervention torque to the MCU 60 during the shift control, such that the MCU 60 controls the regenerative operation of the motor in response to the intervention torque command.

Further, when the intervention torque received from the TCU 40 reaches the motor torque command of the target gear stage in the shift end section after the completion of the actual shift, the HCU 20 preferably releases and ends the torque intervention control when the intervention torque and the torque command of the target gear stage are within the predetermined range of difference.

The value of the motor torque command (regenerative torque command) at the time when the torque intervention control is released becomes the motor torque command value of the target gear stage.

As a result, in some forms of the present disclosure, after the motor torque command of the target gear stage is calculated as the target value of the torque (intervention torque) control during the shift at the time of the regenerative braking, the control is performed in the state in which the target value is recognized in advance. At the same time, the intervention control ends in the state in which the intervention torque reaches the target value to reduce the fluctuation in the torque at the end of the shift after the actual shift, thereby improving the braking linearity.

FIG. 6 illustrates a curve of the 'motor torque command of the target gear stage', which is obtained from the total braking torque and the regenerative braking executable amount torque, the gear ratio of the target gear stage, etc. that are required by the HCU 20, as described above.

Further, FIG. 6 illustrates a curve of the 'motor torque considering the shift control', which indicates the motor torque, that is, the intervention torque after the intervention entry. Here, the intervention torque is a value determined by setting the motor torque command of the target gear stage as the target value during the shift control section and is transmitted from the TCU 40 to the HCU 20 for the torque intervention control.

Further, FIG. 6 is a diagram illustrating a 'motor torque command' curve, which indicates the motor torque command (regenerative torque command) determined by the HCU 20 and may indicate the torque that does not consider the torque intervention.

Further, FIG. 6 illustrates that the torque intervention release time for the in-gear traveling is the time when the intervention torque (motor torque in consideration of the shift control) reaches the motor torque command of the target gear stage, in the shift end period after the completion of the actual shift.

In the present disclosure, if there is the downshift request while the regenerative braking is made by manipulating the brake pedal by the driver, the torque intervention control for decreasing the absolute value of the motor torque is performed. Here, the intervention torque is determined so that the absolute value thereof decreases until it reaches the motor torque command value of the target gear stage.

Here, the decrease in the absolute value of the intervention torque means that the torque curve (curve of the 'motor torque considering the shift control') on the drawing is increased as illustrated in FIG. 6.

According to the method for controlling a hybrid electric vehicle in some forms of the present disclosure, after the motor torque command of the target gear stage is calculated as the target value of the torque (intervention torque) control during the shift at the time of the regenerative braking, the control is performed in the state in which the target value is recognized in advance. Then, the intervention control ends in the state in which the intervention torque reaches the target value to reduce the fluctuation in the torque at the end of the shift after the actual shift, thereby improving the braking linearity.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a motor torque of a hybrid electric vehicle, the method comprising:
   detecting, with a Transmission Control Unit (TCU), a downshift request during a regenerative braking;
   when the downshift request is detected, determining, with the TCU, a target gear stage and determining, with a Hybrid Control Unit (HCU), a motor torque command, wherein the motor torque command is determined at a pre-shift stage before entering into a torque intervention;
   determining, with the HCU, a motor torque command of the target gear stage;
   determining, with the TCU, an intervention torque based on the motor torque command at the pre-shift stage and the motor torque command of the target gear stage during a downshift control process; and
   controlling, with a Motor Control Unit (MCU), a torque intervention to control a regenerative operation of the motor based on the intervention torque,
   wherein determining the intervention torque includes changing the intervention torque from the motor torque command at the pre-shift stage to a target value during a shift preparation period such that the intervention torque is changed based on slopes set by each shift phase of a plurality of shift phases during the shift preparation period,
   wherein the target value is set as the motor torque command of the target gear stage,
   wherein the motor torque command of the target gear stage is calculated from a gear ratio of the target gear stage and an amount that executes the regenerative braking, and
   wherein the intervention torque is changed based on a predetermined slope during the shift preparation period.

2. The method of claim 1, wherein, when the intervention torque and the motor torque command of the target gear stage are within a predetermined range of difference after a completion of an actual shift during the shift control process, the torque intervention control ends.

3. The method of claim 2, wherein a motor torque command at a moment that the torque intervention control ends is the motor torque command of the target gear stage.

4. The method of claim 1, wherein time for entering into the torque intervention is determined when the torque intervention reaches a predetermined shift phase in a shift preparation stage during the downshift control process.

5. The method of claim 1, wherein, when a total braking amount is distributed into an amount of a frictional braking and the amount that executes the regenerative braking, the HCU is configured to obtain the motor torque command of the target gear stage based on a gear ratio of the target gear stage, an efficiency of a transmission, and the amount that executes the regenerative braking, wherein the total braking amount is determined depending on a manipulation of a brake pedal by a driver during the regenerative braking.

6. The method of claim 1, wherein the intervention torque is determined to change from the motor torque command to the target value based on the slopes set by each shift phase of the plurality of shift phases during the downshift control process.

7. The method of claim 6, wherein, when the intervention torque reaches the target value during the shift control process, the intervention torque is determined to be maintained as the target value.

\* \* \* \* \*